United States Patent [19]
Haggard

[11] Patent Number: 5,902,365
[45] Date of Patent: May 11, 1999

[54] FILTER HOSE ASSEMBLY EMPLOYING A CONICAL FILTER ELEMENT

[75] Inventor: Clifford D. Haggard, Fayetteville, N.C.

[73] Assignee: Purolator Products Company, Tulsa, Okla.

[21] Appl. No.: 09/063,595

[22] Filed: Apr. 21, 1998

Related U.S. Application Data

[62] Division of application No. 08/804,241, Feb. 20, 1997, Pat. No. 5,766,289, which is a division of application No. 08/544,068, Nov. 6, 1995, Pat. No. 5,632,793, which is a continuation-in-part of application No. 08/515,728, Aug. 16, 1995, Pat. No. 5,632,792.

[51] Int. Cl.⁶ .......................... B01D 27/06; B01D 46/02
[52] U.S. Cl. ............................ 55/498; 55/500; 55/502; 55/511; 55/521; 210/493.5; 210/497.3
[58] Field of Search ................ 55/385.3, 497–502, 55/509, 511, 513, 521; 210/493.1, 493.5, 497.01, 497.2, 497.3

[56] References Cited

U.S. PATENT DOCUMENTS

| | | | |
|---|---|---|---|
| Re. 32,851 | 1/1989 | Tarala ................................. | 55/497 X |
| 2,185,584 | 1/1940 | Boyce ................................. | 55/498 X |
| 2,510,440 | 6/1950 | Vokes ................................. | 55/500 X |
| 2,910,717 | 11/1959 | Raymond ............................ | 55/521 X |
| 3,640,396 | 2/1972 | Brownell ............................ | 55/498 X |
| 3,803,810 | 4/1974 | Rosenberg .......................... | 96/6 |
| 3,937,663 | 2/1976 | Bessiere ............................. | 55/498 X |
| 3,941,697 | 3/1976 | Johnson ............................. | 210/167 |
| 4,065,276 | 12/1977 | Hakaya et al. .................... | 55/521 X |
| 4,135,899 | 1/1979 | Gauer ................................. | 55/497 X |
| 4,151,095 | 4/1979 | Wright ............................... | 55/497 X |
| 4,157,902 | 6/1979 | Tokar ................................. | 55/385.3 |
| 4,211,543 | 7/1980 | Tokar et al. ....................... | 55/497 X |
| 4,261,710 | 4/1981 | Sullivan ............................ | 55/497 X |
| 4,512,891 | 4/1985 | Wright et al. ..................... | 55/497 X |
| 4,595,401 | 6/1986 | Witchell ............................ | 55/385.3 |
| 4,925,561 | 5/1990 | Ishii et al. ......................... | 55/497 X |
| 5,106,397 | 4/1992 | Jaroszczyk et al. .............. | 55/270 |
| 5,125,940 | 6/1992 | Stanhope et al. ................. | 55/385.3 |
| 5,128,039 | 7/1992 | Gabrielson ....................... | 55/498 X |
| 5,263,503 | 11/1993 | St. Jean ............................ | 134/166 R |
| 5,269,824 | 12/1993 | Takita ............................... | 55/497 X |
| 5,275,636 | 1/1994 | Dudley et al. ................... | 55/274 |
| 5,318,608 | 6/1994 | Boone .............................. | 55/385.3 |
| 5,320,657 | 6/1994 | Adams ............................. | 55/498 X |
| 5,338,446 | 8/1994 | Schuman et al. ............... | 210/169 |
| 5,431,706 | 7/1995 | Paas ................................. | 55/385.3 X |
| 5,490,868 | 2/1996 | Whitlock et al. ............... | 55/509 X |
| 5,522,909 | 6/1996 | Haggard .......................... | 55/327 |
| 5,632,792 | 5/1997 | Haggard .......................... | 55/497 |
| 5,632,793 | 5/1997 | Haggard .......................... | 55/502 X |
| 5,766,289 | 6/1998 | Haggard .......................... | 55/498 |

FOREIGN PATENT DOCUMENTS

| | | | |
|---|---|---|---|
| 0356030 | 9/1961 | Switzerland ..................... | 55/521 |
| 2064359 | 6/1981 | United Kingdom ............ | 55/521 |
| 2159434 | 12/1985 | United Kingdom ............ | 55/385.3 |

*Primary Examiner*—Robert Spitzer
*Attorney, Agent, or Firm*—Joseph V. Tassone

[57] ABSTRACT

A filter assembly is formed of an impervious elongated tubular housing and an elongated filter member positioned within the housing. In a first embodiment a barrier is interposed between a filter member first surface and the housing internal tubular surface adjacent the housing inlet end and another barrier is interposed between the filter member second surface and the housing internal tubular surface adjacent the housing outlet end. In a second embodiment, the filter member is formed of a pleated sheet, the pleats being folded at their ends, and the pleated sheet is formed into a frusto-conical shape with the conical base secured to the tubular housing interior surface. Air flowing into the housing inlet end passes through the filter member before exiting at the outlet end.

19 Claims, 6 Drawing Sheets

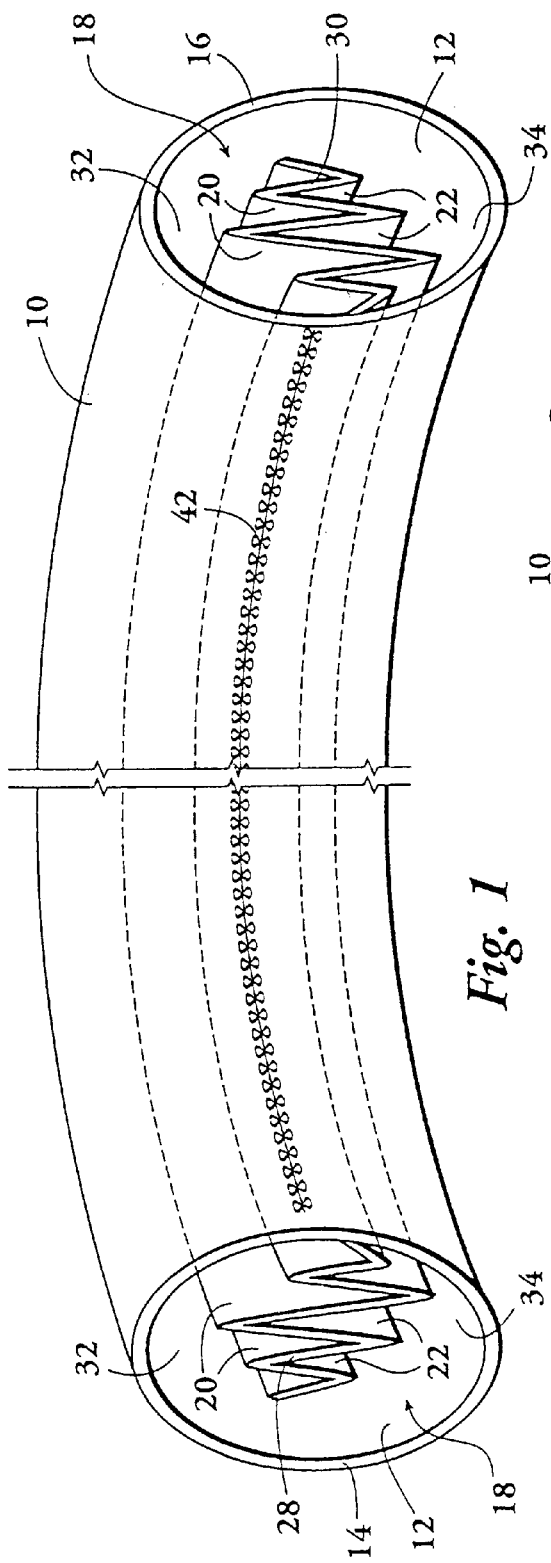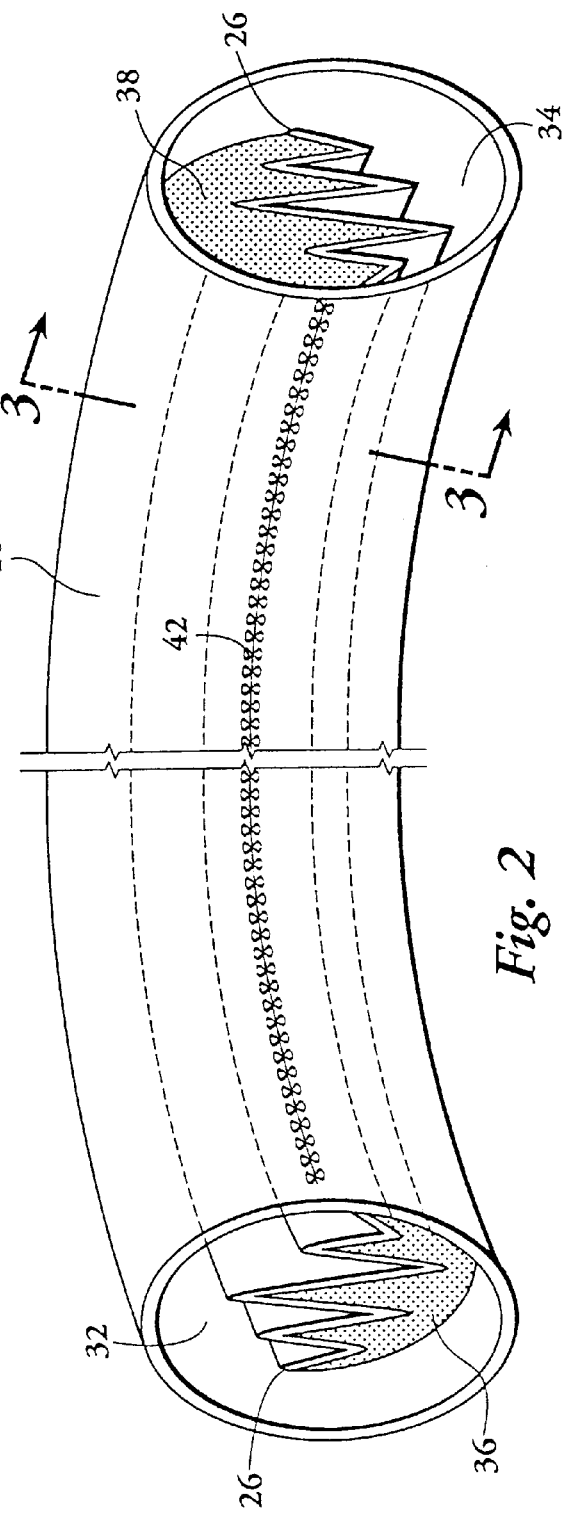

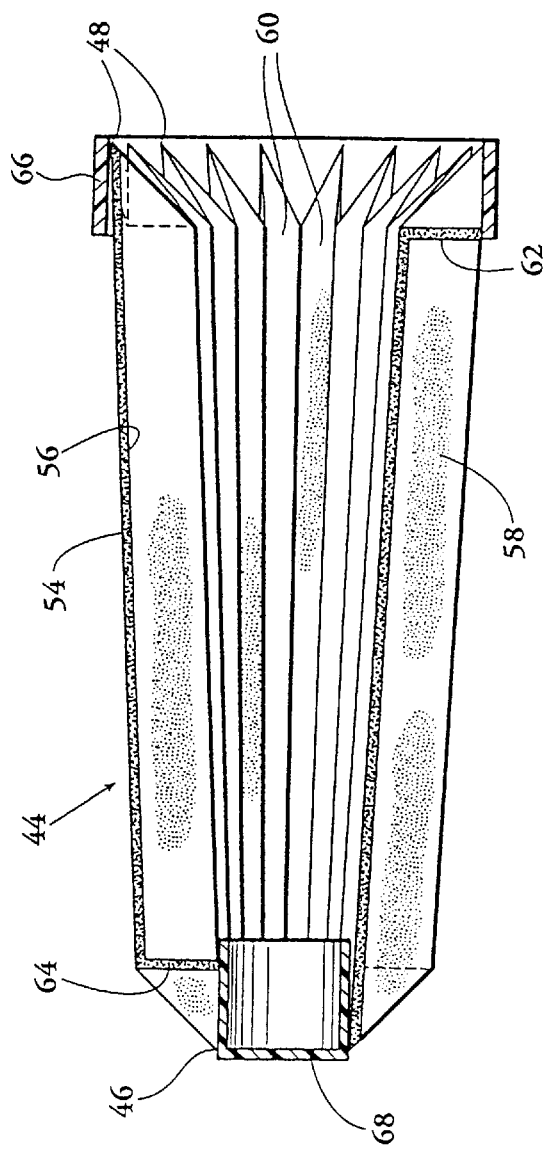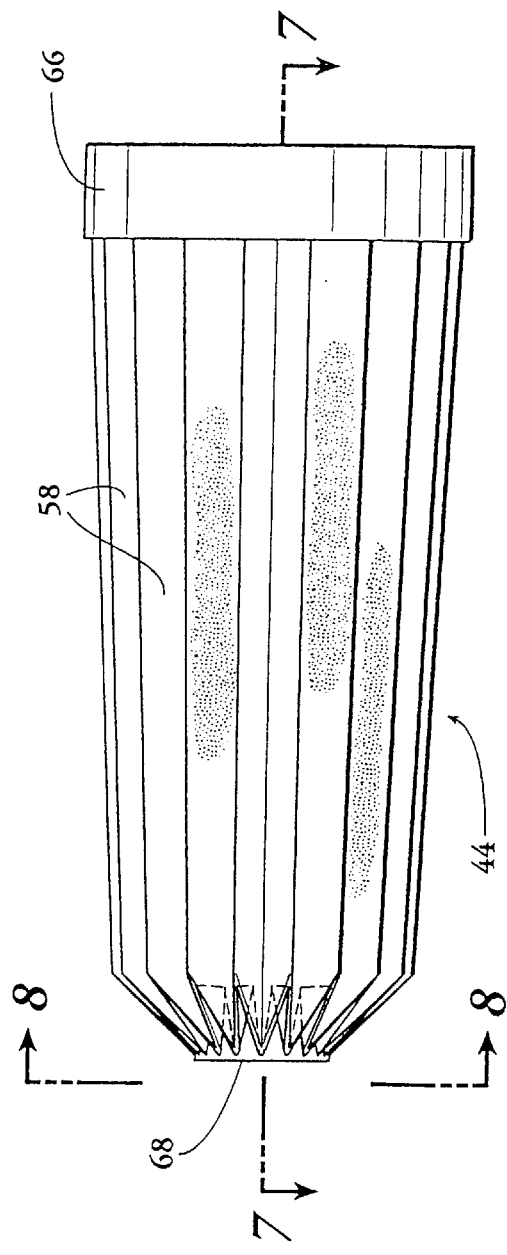

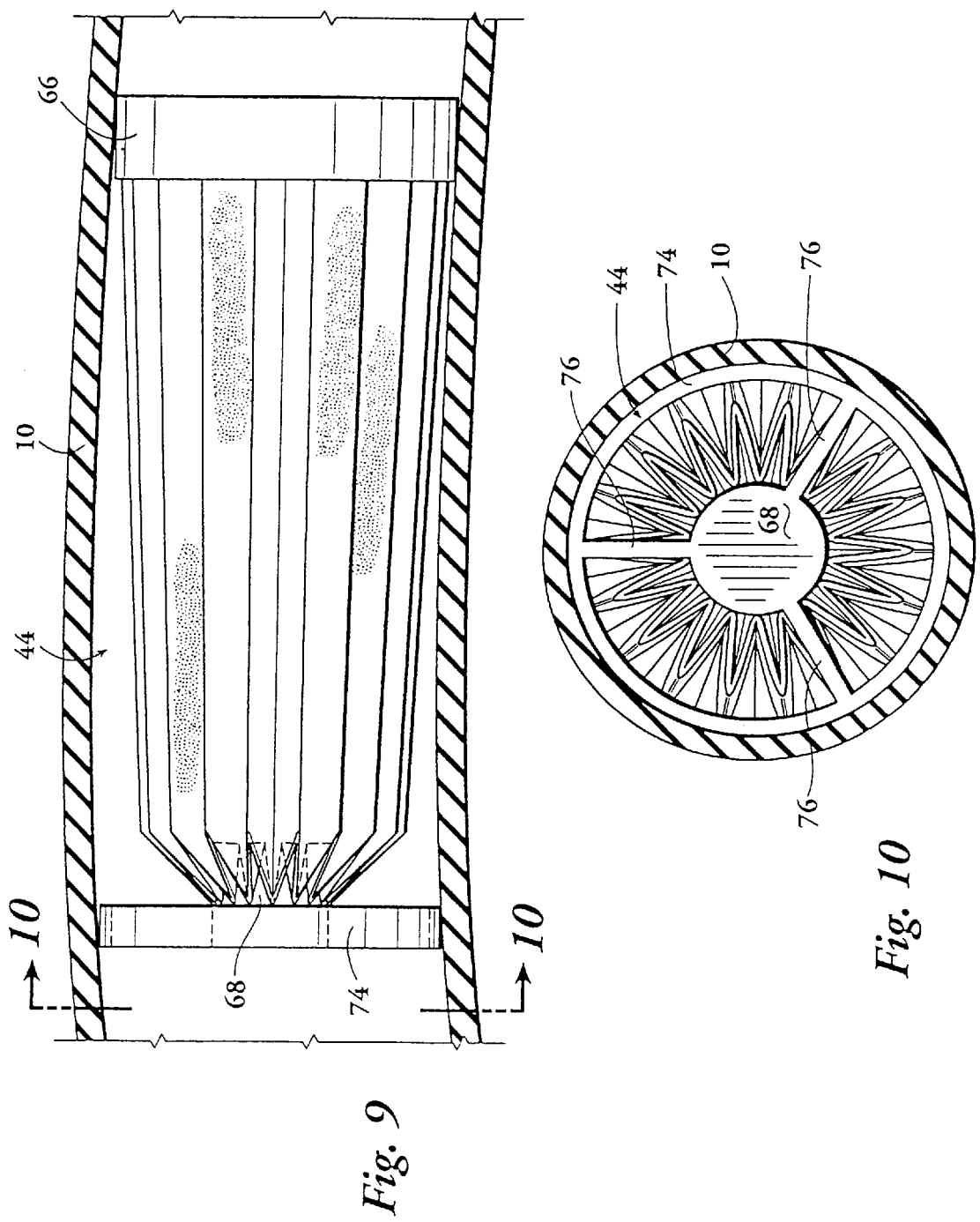

FILTER HOSE ASSEMBLY EMPLOYING A CONICAL FILTER ELEMENT

CROSS-REFERENCE TO RELATED APPLICATIONS

This application is a divisional patent application of its parent patent application, Ser. No. 08/804,241, filed Feb. 20, 1997 now U.S. Pat. No. 5,766,289; issued Jun. 16, 1998 which, in turn, is a divisional patent application of Ser. No. 08/544,068 filed Nov. 6, 1995, now U.S. Pat. No. 5,632,793 issued May 27, 1991; which, in turn, is a continuation-in-part of Ser. No. 08/515,728 filed Aug. 16, 1995, now U.S. Pat. No. 5,632,792.

BACKGROUND OF THE INVENTION

I. Field of the Invention

The present invention relates to an air filter device in the form of an elongated tubular member, such as, a hose, which may be flexible, having an inlet end and an outlet end for filtration of air passing through the tubular member. The filter device is particularly adaptable for use as an air filter for automobile or truck engines.

II. Prior Art

Air filter devices for internal combustion engines are well known and have been utilized on automobiles and trucks almost from the beginning of the manufacture of vehicles propelled by internal combustion engines. Generally an air filter for an internal combustion engine includes a housing having an inlet end through which air is drawn and an outlet end that is in communication with the engine carburetor or intake manifold. A filter element is positioned within the housing through which air is forced to flow.

For many years the typical air filtration system for an automobile and light trucks consisted of a relatively large circumferential housing having a large relatively flat cover plate that could be removed for the installation of the filter element. The typical filter element used for cars and trucks for many years was in the form of a short length relatively large diameter tubular member sealed on both ends and arranged, when positioned within the housing, for air to flow radially through the filter element from the exterior to the interior, the interior being in communication with the automobile air intake system. Filters of this type function satisfactorily except that the housing is relatively large and takes up considerable space within the engine compartment. As automobiles have been reduced in size and weight to achieve improved fuel economy and have been streamline to reduce air resistance, the space within engine compartments has become greatly diminished. For this reason in recent years air filters for automobiles have taken on different configurations so as to more readily adapt them to fit within confined and irregular shaped spaces within an engine compartment.

The use of filter housings having an elongated cylindrical shape has become more common as illustrated in U.S. Pat. Nos. 5,125,940 entitled "In-Line Air Filter Apparatus" and 5,106,397 entitled "Air Cleaner/Noise Silencer Assembly". Reference may also be had to pending U.S. application Ser. No. 08/364,617 now U.S. Pat. No. 5,522,909 which describes and illustrates a type of frusto-conical shaped filter element for use in a filter housing.

For additional background information relating to filtration systems, reference may be had to the following United States patents: U.S. Pat. Nos. 5,263,503; 5,275,636; 5,338,446 and 3,941,697.

BRIEF SUMMARY OF THE INVENTION

The invention is an air induction filter hose assembly that is particularly useful for filtering induction air for an internal combustion engine and most specifically, for use in an automobile, truck or bus application where space is limited around the engine.

The invention is a filter assembly in the form of an elongated impervious tubular housing that is preferably in the form of a semi-rigid elastomeric hose. The hose may be of various cross-sectional arrangements but preferably is circular to thereby allow maximum flexibility. In a first embodiment, an elongated filter member is positioned within the tubular housing. The filter member has opposed first and second surfaces, opposed longitudinal edges, a first and a second end. The longitudinal opposed edges of the filter member are sealed to the housing internal tubular surface. The edges of the filter member may be sealed by bonding, by adhesive or the edges can be encapsulated in the elastomeric material of which the tubular housing is formed. One method of manufacturing the filter assembly is to injection mold the tubular housing around the filter member to thereby encapsulate the longitudinal edges.

A first barrier is positioned within the tubular housing at the filter member first end. The first barrier is configured to sealably engage the filter member first surface and the interior tubular surface of the tubular housing that is opposed to the filter member first surface. The first barrier therefore leaves an open space at the filter member first end between the filter member second surface and the internal tubular surface of the housing.

In a similar manner, a second barrier is interposed between the filter member second surface and the housing internal tubular surface adjacent the filter member second end. Induction air entering the housing inlet end must pass through the filter member before exiting at the housing outlet end.

The filter member is preferably formed of a sheet of polyester non-woven filter media. Further, the filter member sheet is preferably pleated lengthwise to thereby substantially increase its cross-sectional area. The first and second barriers may be formed of impervious relatively thin plastic plates bonded at one edge to the filter media and at the opposed edge to the interior wall of the tubular housing. Another embodiment is to form the first and second barriers of filter material, such as a sheet of polyester non-woven filter media.

In another embodiment, a thin filter material having opposed first and second surfaces and having opposed first and second ends is folded to define a series of longitudinal pleats extending between the first and second ends. The pleats define pairs of opposed walls providing first channels defined by the first surface and alternate second channels defined by the second surface. Each of the first channels at the first end is folded into lateral folds in the direction towards the first surface. Each of the second channels at the second end are folded into lateral folds in the direction towards the second surface. The first lateral folds serve to close off the first longitudinal channels at the first end and the second lateral folds serve to close off the second longitudinal channels at the second end. The filtration element is completed by using this pleated and folded member by forming it into an elongated frusto-conical arrangement having a conical axis so that the longitudinal pleats extend generally radially of the conical axis. In such frusto-conical shape, the first surface is an annular interior surface and the second surface is an annular exterior surface. The conical base end has an enlarged cross-sectional area.

The filter frusto-conical element is positioned within an impervious elongated tubular housing with the filter element conical base end sealed to the tubular housing internal tubular surface. The filter element reduced diameter conical end is closed so that air flowing through the tubular housing must pass through the filter material.

The filter hose assembly of this invention when used as a part of a car or truck, performs dual functions. First, it conducts inlet air from a location within the vehicle to the engine intake system, and second, the air flowing through the hose is filtered without requiring a separate air filter housing.

A better understanding of the invention will be obtained from the following description of the preferred embodiments, taken in conjunction with the attached drawings.

DESCRIPTION OF THE DRAWINGS

FIG. 1 is an elevational view of a filter hose assembly that incorporates the principles of this invention. The figure shows a tubular housing containing an elongated pleated filter member. The elongated edges of the filter member are affixed to the internal wall of the tubular housing. The tubular housing is shown curved, indicating that it may be semi-rigid or flexible. FIG. 1 is shown broken away since the length of the filter hose assembly can vary as required.

FIG. 2 is an external elevational view as shown in FIG. 1 but showing a first and a second barrier positioned within the interior of the tubular housing. The barriers form a flow path through the tubular housing requiring air entering the inlet end to flow through the filter member before exiting the outlet end.

FIGS. 5 through 11 show an alternate embodiment of the invention wherein the filter element positioned within the tubular housing is of a frusto-conical configuration. FIG. 5 is an elevational cross-sectional view of a filter hose assembly. The hose can be, and is illustrated as being, of elastomeric material so as to afford flexibility.

FIG. 6 is an external elevational view of a frusto-conical filter element as shown in FIG. 5.

FIG. 7 is a cross-sectional view taken along the line 7—7 of FIG. 6, showing the configuration of the frusto-conical filter member. In the embodiment of FIG. 5, a tubular base ring is shown having an enlarged diameter integral sealing lip that fits within an internal circumferential slot within the tubular housing. In FIGS. 6 and 7 the filter element base ring is not provided with a circumferential sealing lip.

FIG. 8 is an enlarged elevational end view of the filter element of FIG. 6 as taken along the line 8—8 of FIG. 6.

FIG. 9 is an elevational cross-sectional view of an embodiment wherein a support ring is employed to centrally support the frusto-conical nose portion of the filter element centrally within the interior of a tubular housing.

FIG. 10 is an elevational cross-sectional view, taken along the line 10—10 of FIG. 9, showing an end view of the filter element nose support ring.

FIG. 11 is an elevational isometric view of an intermediate step in the process of forming the filter element as employed in FIGS. 5–10. This figure shows a flat sheet of filter material having been longitudinally pleated. Folds are formed at each end of the pleats to close off the internal pleats at one end and the external pleats at the other end. A pleated and folded filter sheet of FIG. 11 is formed into a frusto-conical shape to provide the filter elements illustrated in FIGS. 5 through 10.

DETAILED DESCRIPTION OF THE PREFERRED EMBODIMENTS

Figure 3:
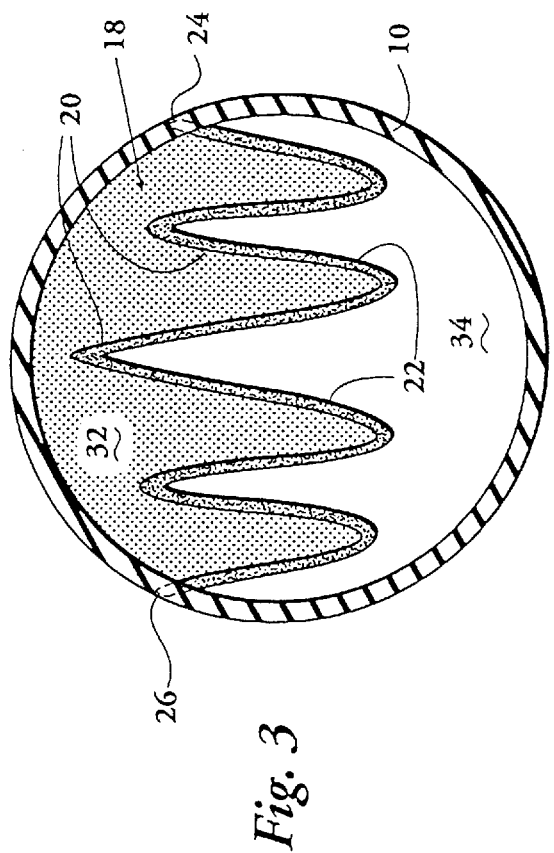
FIG. 3 is a cross-sectional view, taken along the line 3—3 of FIG. 2, showing the relationship between the tubular housing, the filter member and the outlet end barrier.

Referring to the drawings and first to FIGS. 1 and 2, the basic concepts of the invention are illustrated. An impervious elongated tubular housing 10 has an internal tubular surface 12, an inlet end 14 and an outlet end 16. Tubular housing 10 may be of a variety of cross-sectional configurations, such as square, elliptical, and so forth, however, a circular configuration as illustrated in FIGS. 1 and 2, except for special applications, is the preferred embodiment. By use of a circular cross-sectional configuration, tubular housing 12 can be made to be equally flexible in any direction thus more readily adapting the air induction filter hose assembly to a variety of spacial applications.

Tubular housing 10 is preferably formed of an elastomeric material. While housing 10 may be rigid or substantially rigid, the preferred embodiment is that housing 10 be semi-rigid, that is, the housing should have sufficient structural rigidity to substantially maintain its cross-sectional configuration but, at the same time, permit the housing to be bent or curved at least slightly along its longitudinal tubular axis so as to accommodate space requirements commonly encountered when the filter hose assembly is used to filter induction air for an internal combustion engine.

Positioned within tubular housing 10 is an elongated filter member 18. Filter member 18 has a first surface 20, an opposed second surface 22, opposed longitudinal 20 edges 24 and 26 (best seen in FIG. 3), a first end 28 and second end 30. The length of filter member 18 is not greater than the length of tubular housing 10 and is illustrated as being somewhat shorter than that of tubular housing 10. Filter member first end 28 is adjacent tubular housing inlet end 14, and the second end 30 is adjacent tubular housing outlet end 16.

Longitudinal edges 24 and 26 are secured to tubular surface 12 of tubular housing 10. This can be accomplished such as by bonding with an adhesive or the tubular housing may be injection molded around the filter member 18 so that filter member edges 24 and 26 are encompassed within the tubular housing as illustrated in FIG. 3. Any mechanism by which the longitudinal edges of the filter member 18 are permanently secured to the interior wall is within the scope of this invention.

Filter member 18 divides the interior of tubular housing 10 into a first space 32 that exists between filter member first surface 20 and interior tubular surface 12 and, in like manner, a second space 34 that extends between the filter member second surface 22 and interior tubular surface 12 of the housing.

To define flow paths within the air induction hose assembly, a first barrier 36 is secured to the filter member second surface 22 adjacent first end 28 and to the internal tubular surface 12 of tubular housing 10 adjacent first end 14 (as seen at the left end of FIG. 2). In like manner, a second barrier 38 is secured between filter member first surface 20 and the interior tubular surface 12 of tubular housing 10 adjacent the filter member second end 30 adjacent to housing second end 16 (seen at the right hand end of FIG. 2).

The cross-sectional configuration of filter member 18 may vary considerably. In the preferred arrangement, filter member 18 is formed of a flat sheet of thick, high-loft polyester non-woven filter media. This flat sheet is preferably pleated as illustrated in the figures. Pleating is commonly employed in filtration equipment to substantially increase the cross-sectional area of the filter media. It is obvious that the cross-sectional area of the filter media for a given diameter and length of tubular housing can be dramatically increased by increasing the height of the pleating as well as the number of pleats employed.

First and second barriers 36 and 38 may be formed of thin impervious material, such as sheet plastic material, or may be formed of filter media, that is, formed of sheets of polyester non-woven filter media that is bonded to filter member 18 and internal tubular surface 12 of tubular housing 10.

Figure 4:
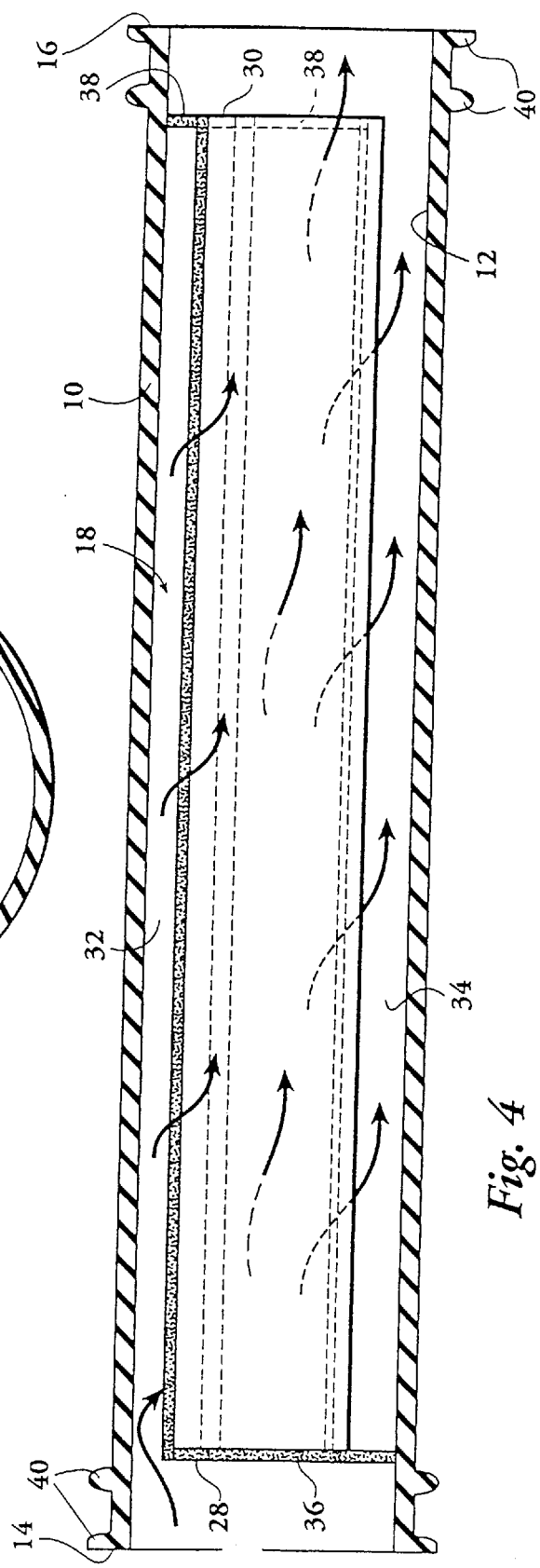
FIG. 4 is an elevational cross-sectional view of a straight tubular housing. By the use of arrows the flow paths through the housing are shown.

FIG. 4 illustrates, by arrows, the path of flow through the filter from the inlet end 14 to outlet end 16. The air induction filter hose assembly as illustrated and described herein is particularly adapted for use to provide induction air to an internal combustion engine such as for automobiles, trucks and so forth, however, the invention may be employed for purposes other than air filtration.

Filter member 18 may be supported by the use of top and bottom combs (not shown) or other kinds of standoff may be employed to provide structural rigidity of the filter member as necessary. Such combs or standoffs, when used, will be constructed so as to provide minimum interference with the flow paths.

The embodiment of FIG. 4 shows integral reinforcing ribs 40 formed adjacent the housing inlet and outlet ends 14 and 16. These are illustrative of the fact that the tubular housing may be designed to receive clamps or other apparatus by which the ends of the tubular housing may be attached to other components in an automobile or truck assembly or for other applications. While not illustrated, the tubular housing, obviously, could include metallic or rigid plastic structural reinforcing components as an integral part thereof to maintain the configuration of the housing adjacent the ends for better connection to other apparatuses.

The air induction filter hose assembly as herein described offers many advantages over the standard type of air filtration used in automobiles, trucks and so forth. First, by combining the filtration system with an air induction hose, two functions are concurrently achieved by the same apparatus, thus reducing space and weight requirements. Second, the filtration system employed integrally with the air induction hose means that air velocity will be maintained at a substantially consistent rate throughout the induction passageway, as compared with other filtration systems wherein an induction hose connects to a housing in which a filter element is located.

As previously stated, edges 24 and 26 of the filter member can be bonded to or encompassed within the housing interior tubular surface. FIGS. 1 and 2 show, on the exterior surface of the tubular housing, areas 42 opposed to the interior surface where the filter member edges are embedded. As a practical matter, depending upon the type of construction employed, exterior visual indication of the area where the filter member edges are encompassed may or may not exist.

Figure 11:
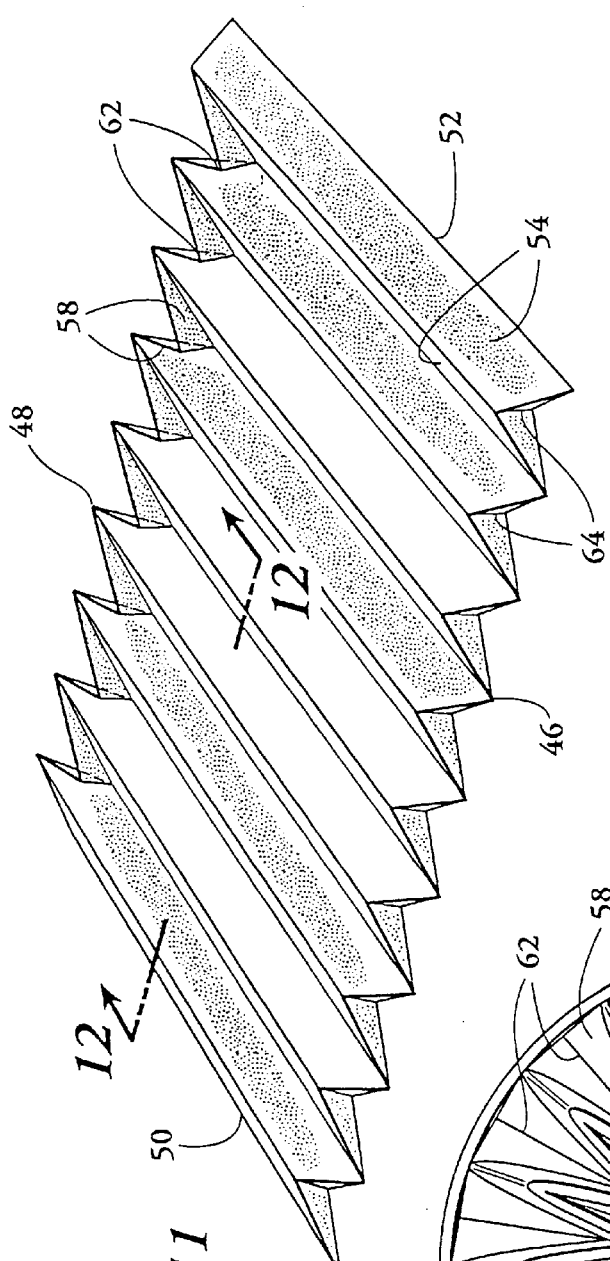
Figure 12:
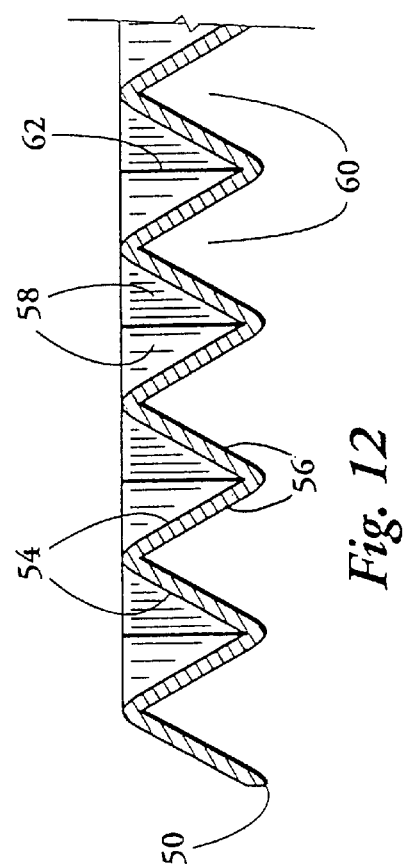
FIG. 12 is a fragmentary cross-sectional view of the pleated filter media taken along the line 12—12 of FIG. 11.
Figure 8:
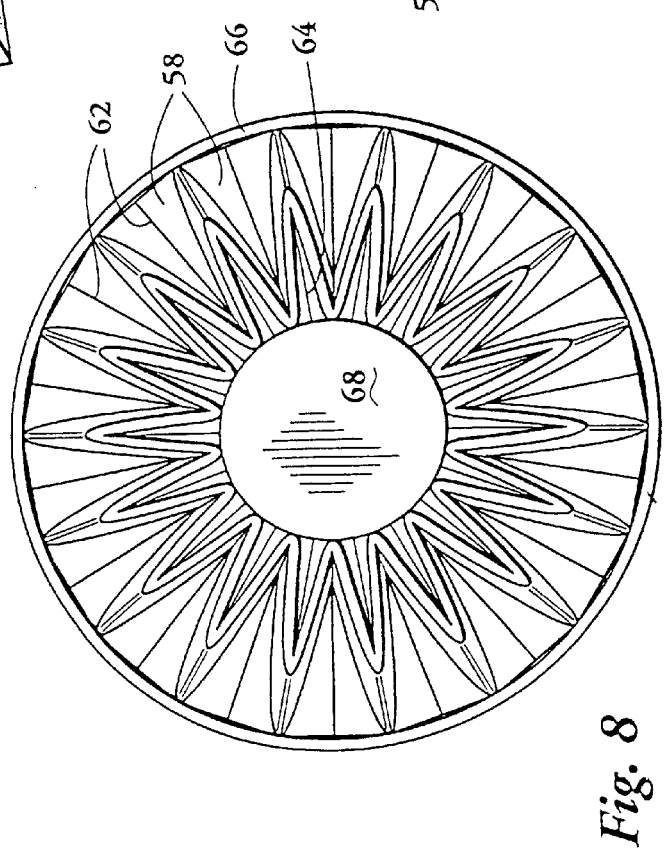

An alternate embodiment of the invention is shown in FIGS. 5 through 10. This alternate embodiment employs a frusto-conical pleated and folded filter element as illustrated in FIGS. 6 and 7, the frusto-conical filter element being indicated generally by the numeral 44. However, to best understand the construction of element 44, reference may be had to FIGS. 11 and 12. In FIG. 11, a sheet of filter media, frequently called filter paper, has a first end 46, a second end 48, a first side edge 50 and an opposed second side edge 52. The sheet of filter media is folded into elongated pleats, the pleats extending between first end 46 and second end 48. The filter media has a first surface 54 (see FIG. 11) and an opposed second surface 56. The longitudinal pleats define pairs of opposed walls providing alternate first channels 58 and opposed second channels 60. Each of the first channels at the second end 48 are laterally folded in the direction towards the first end 46 and each of the second channels are laterally folded at 64 in the direction towards second end 48. First folds 62 serve to close off first channels 58 at the filter element second end 48 and, in like manner, second folds 64 serve to close off second channels 60 at filter element first end 46.

After a sheet of filter media has been pleated and folded as shown in FIG. 11, it is formed into a frusto-conical shape with the opposed edges 50 and 52 sealed to each other, the conical shape of the filter media being illustrated in FIGS. 6 and 7. To complete the filter element as shown in FIGS. 6 and 7, a base ring 66 is bonded to the frusto-conical base. Base ring 66 is preferably formed of a semi-rigid plastic material.

To close off the interior of the frusto-conical shaped pleated and folded filter element, a nose plug 68 is employed. This element is also preferably formed of plastic and is a cup shaped member that it is tubular, having a closed end. The inner edges of folds 64 are bonded to nose plug 68.

Figure 5:
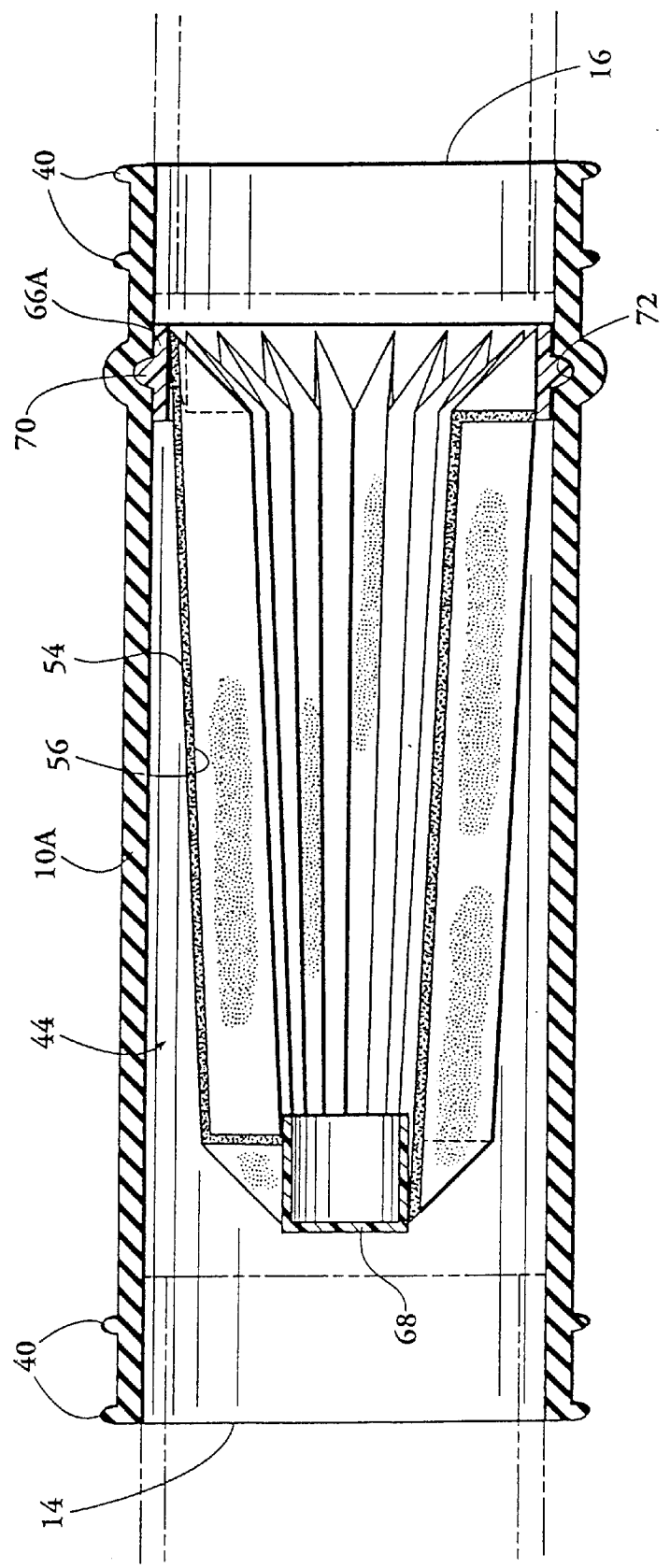

FIG. 5 shows the frusto-conical filter element 44 mounted within tubular housing 10A, the tubular housing or hose being the type described with reference to FIG. 4. In the embodiment illustrated in FIG. 5, base ring 66A has an integral circumferential lip 70. Tubular housing 10A is provided with an internal circumferential recess 72. Circumferential lip 70 is received within circumferential recess 72 to sealably retain base ring 66A and thereby filter element 44 within tubular housing 10A.

The ends of tubular housing 10A are provided with reinforcing ribs 40 as previously described with reference to FIG. 4 as a means of mounting the tubular housing to other portions of an automobile or truck air intake system.

In the embodiment of FIG. 5, the tubular filter element 44 is cantilevered from base ring 66A, that is, nose plug 68 is not supported. FIGS. 9 and 10 show an alternate embodiment in which the nose plug includes an integrally formed support ring 74 with connecting spokes 76. Support ring 74 and spokes 76 are preferably formed of semi-rigid plastic material and the ring is dimensioned to be snugly received within the on interior of tubular housing 10. In the embodiment of FIG. 9, base ring 66 is cylindrical on its exterior surface to frictionally engage the interior of tubular housing 10.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. A filter element for use in a filtration unit comprising:

an elongated tubular member having a first end and a second end, having an external and internal generally cylindrical surfaces each having a cylindrical axis, the external cylindrical surface having a plurality of paralleled longitudinal external channels in planes of its cylindrical axis, the internal cylindrical surface having a plurality of paralleled longitudinal internal channels in planes of its cylindrical axis, the external and internal channels being interleaved with each other and separated by filter media, said external longitudinal channels being closed by outwardly extending folds of filter media at said tubular member first end providing a frusto-conical concave shape and said internal longitudinal channels being closed by folds of inwardly extending filter media at said tubular member second end providing a frusto-conical convex end configuration.

2. A filter element for use in a filtration unit according to claim 1 wherein said external surface of said elongated tubular member has an external diameter that is larger at one said end than at the other said end so that thereby said filter element in external elevational view is of frusto-conical shape.

3. A filter element for use in a filtration unit according to claim 1 wherein said internal surface of said elongated tubular member internal diameter that is larger at one said end than at the other said end so that thereby said filter element internal surface is of concave frusto-conical shape when viewed from said end having said larger internal diameter.

4. A filter element for use in a filtration unit according to claim 1 wherein said internal cylindrical surface defines an internal passageway and including a member closing one end of the internal passageway.

5. A filtration apparatus comprising;

a housing having a flow passageway therethrough connected to a housing inlet and a housing outlet;

a filter element positioned within said housing in the form of an elongated tubular member having a first end and a second end, having an external and internal generally cylindrical surfaces each having a cylindrical axis, the external cylindrical surface having a plurality of paralleled longitudinal external channels in planes of its cylindrical axis, the internal cylindrical surface having a plurality of paralleled longitudinal internal channels in planes of its cylindrical axis, the external and internal channels being interleaved with each other and separated by filter media, said external longitudinal channels being closed by outwardly extending folds of filter media at said tubular member first end providing a frusto-conical concave shape and said internal longitudinal channels being closed by inwardly extending folds of filter media at said tubular member second end providing a frusto-conical convex shape; and sealing apparatus connecting said tubular member external surface to one of said housing inlet and said housing outlet and connecting said tubular member internal surface to the other of said housing inlet and said housing outlet.

6. A filtration apparatus according to claim 5 in which said tubular member in external elevational view is frusto-conical in shape.

7. A filtration apparatus according to claim 6 in which said tubular member first end has a larger cross-sectional area than a cross-sectional area of said tubular member second end.

8. A filtration apparatus according to claim 7 including a member closing said second circumferential end.

9. A filtration apparatus according to claim 7 including a support member positioned within said housing flow passageway and affixed to and centrally supporting said tubular member second circumferential end within said passageway.

10. A filtration apparatus according to claim 9 wherein said support member has a plug portion received within said tubular member second circumferential end that forms a closure member closing said tubular member second end.

11. A filtration apparatus according to claim 10 wherein said support member includes a circumferential ring portion that engages said housing flow passageway and a plug portion forming said closure member, the plug portion being centrally positioned with respect to said ring portion and at least one radial spoke interconnecting said plug portion and said ring portion.

12. A filtration apparatus according to claim 5 wherein said housing is flexible.

13. A filtration apparatus according to claim 12 wherein said housing is tubular.

14. A filtration apparatus according to claim 13 including circumferential reinforcing means attached to said tubular housing adjacent at least one of said housing inlet and said housing outlet.

15. A filtration apparatus according to claim 13 including:

a mounting ring internally receiving said tubular member first end, the mounting ring being secured to an internal surface of said tubular housing.

16. A filtration apparatus according to claim 15 wherein said mounting ring and said flow passageway share a circumferential groove and a circumferential external ledge combination whereby said mounting ring is sealably secured to said flow passageway.

17. A filtration apparatus according to claim 16 wherein said flow passageway has said internal circumferential groove therein and wherein said mounting ring has on an external circumferential surface said circumferential external ledge that is sealably received in said housing internal circumferential groove.

18. A filtration apparatus according to claim 5 in which said tubular member is formed of sheet of pleated filter media.

19. A filtration apparatus according to claim 5 wherein said longitudinal internal and external channels extend generally radially of said cylindrical axii.

* * * * *